United States Patent
Fukushima et al.

(10) Patent No.: US 10,884,114 B2
(45) Date of Patent: Jan. 5, 2021

(54) RADAR DEVICE

(71) Applicant: MITSUBISHI ELECTRIC CORPORATION, Tokyo (JP)

(72) Inventors: Fuyuki Fukushima, Tokyo (JP); Teruyuki Hara, Tokyo (JP); Satoshi Kageme, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 188 days.

(21) Appl. No.: 16/086,439

(22) PCT Filed: Apr. 19, 2016

(86) PCT No.: PCT/JP2016/062327
§ 371 (c)(1),
(2) Date: Sep. 19, 2018

(87) PCT Pub. No.: WO2017/183097
PCT Pub. Date: Oct. 26, 2017

(65) Prior Publication Data
US 2019/0101635 A1    Apr. 4, 2019

(51) Int. Cl.
*G01S 13/53*    (2006.01)
*G01S 13/90*    (2006.01)
(Continued)

(52) U.S. Cl.
CPC ............ *G01S 13/53* (2013.01); *G01S 7/2927* (2013.01); *G01S 13/343* (2013.01); *G01S 13/347* (2013.01); *G01S 13/42* (2013.01); *G01S 13/904* (2019.05); *G01S 13/9047* (2019.05); *G01S 2007/2883* (2013.01); *G01S 2007/356* (2013.01)

(58) Field of Classification Search
CPC ....... G01S 13/53; G01S 13/904; G01S 7/2927
See application file for complete search history.

(56) References Cited

U.S. PATENT DOCUMENTS 6,703,967 B1 *   3/2004   Kuroda .................. G01S 13/348
                                                   342/111
8,305,262 B1 *  11/2012   Nuthalapati .......... G01S 13/282
                                                   342/196
(Continued)

FOREIGN PATENT DOCUMENTS

JP    2009-84791 A    4/2009
JP    2013-68433 A    4/2013

OTHER PUBLICATIONS

Dai et al., "Low-sidelobe HRR profiling based on the FDLFM-MIMO radar", APSAR 2007, pp. 132-135.
(Continued)

*Primary Examiner* — Marcus E Windrich
(74) *Attorney, Agent, or Firm* — Birch, Stewart, Kolasch & Birch, LLP (57) ABSTRACT

Transmission antennas (2-#1 to 2-#M) transmit radiowaves of frequency bands uncorrelated with each other. Receivers (5-#1 to 5-#L) receives target-reflected waves reflected by a target. Pulse compressors (7-#1 to 7-#L) and transmission DBF units (8-#1 to 8-#L) suppress false peaks generated by the Doppler frequency in the target-reflected waves and combines the target-reflected waves. A reception DBF unit (9) and a target detector (10) detect the target based on the results of the combined signals.

6 Claims, 11 Drawing Sheets

(51) Int. Cl.
    *G01S 13/34*     (2006.01)
    *G01S 13/42*     (2006.01)
    *G01S 7/292*     (2006.01)
    *G01S 7/35*     (2006.01)
    *G01S 7/288*     (2006.01)

(56) References Cited

U.S. PATENT DOCUMENTS

| | | | | |
|---|---|---|---|---|
| 2005/0068226 | A1* | 3/2005 | Shinonaga | G01S 13/282 342/134 |
| 2008/0169966 | A1* | 7/2008 | Tsuchihashi | G01S 13/931 342/70 |
| 2008/0258962 | A1* | 10/2008 | Kai | G01S 7/4021 342/104 |
| 2010/0039311 | A1* | 2/2010 | Woodington | G01S 13/34 342/70 |
| 2010/0109938 | A1* | 5/2010 | Oswald | G01S 13/522 342/90 |
| 2011/0215964 | A1* | 9/2011 | Shirakawa | G01S 13/003 342/25 R |
| 2013/0069818 | A1 | 3/2013 | Shirakawa et al. | |
| 2013/0194128 | A1* | 8/2013 | Van Der Merwe | H01Q 19/06 342/107 |
| 2015/0061928 | A1* | 3/2015 | Cornic | G01S 13/904 342/25 R |
| 2015/0338505 | A1* | 11/2015 | Oshima | G01S 7/28 342/107 |

OTHER PUBLICATIONS

International Search Report for PCT/JP2016/062327 (PCT/ISA/210) dated Jul. 26, 2016.
Office Action issued in counterpart GB Application No. 1815737.0 dated Nov. 16, 2018.

* cited by examiner

RADAR DEVICE

TECHNICAL FIELD

The present invention relates to a radar device that determines the position of a target by a delay time from radiation of radiowaves to reception of the radiowaves reflected by the target and the direction of the reflected radiowaves.

BACKGROUND ART

As disclosed in, for example, Non-Patent Literature 1, a traditional radar device causes a transmitter to generate signals in different frequency bands and cause a transmission antenna to transmit the signals to determine the position of a target by a delay time from radiation of radiowaves to reception of the radiowaves reflected by the target and by the direction of the reflected radiowaves.

CITATION LIST

Non-Patent Literature

Non-Patent Literature 1: Xi Zeng Dai, Jia Xu, Chunmao Ye, Ying-Ning Peng, "Low-sidelobe HRR profiling based on the FDLFM-MIMO radar", APSAR 2007

SUMMARY OF INVENTION

Technical Problem

Unfortunately, in the traditional technique above, while the target is moving, the received signal spectra are shifted by the Doppler frequency to neighboring frequency bands. This phenomenon generates false peaks at positions away from distances equal to the widths of the transmitted pulses, and these peaks are erroneously detected as a target.

An object of the present invention, which has been made in view of the above mentioned problem, is to provide a radar device that can prevent erroneous detection of a target due to the false peaks.

Solution to Problem

The radar device according to the present invention includes: a transmission module to concurrently transmit radiowaves of different frequency bands from antennas; a reception module to receive target-reflected waves transmitted from the transmission module and reflected by a target; a synthetic processing module to combine the target-reflected waves corresponding to the respective antennas, received by the reception module, in a manner that suppresses false peaks caused by shift to other frequency bands due to the Doppler frequency; and a detection processing module to detect the target using a result of the combining obtained by the synthetic processing module.

Advantageous Effect of Problem

The radar device according to the present invention suppresses false peaks resulting from the target-reflected waves and generated by shift of the target-reflected waves to other frequency bands by the Doppler frequency, and combining the target-reflected waves. Thus, erroneous detection of the target due to the false peaks can be prevented.

DESCRIPTION OF EMBODIMENTS

The embodiments of the present invention will now be described in more detail with reference to the accompanying drawings.

Embodiment 1

Figure 1:
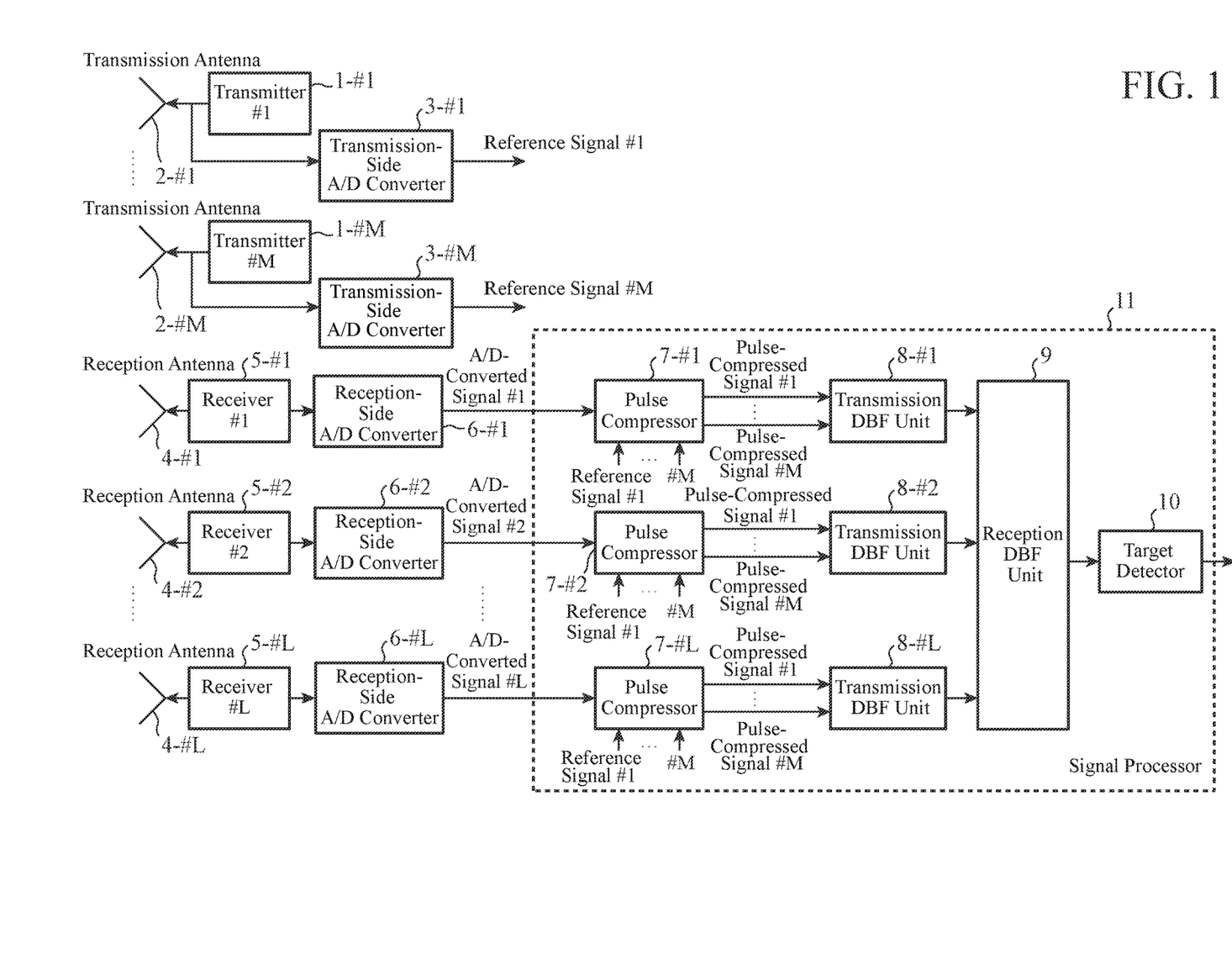
FIG. 1 illustrates a configuration of a radar device according to Embodiment 1 of the present invention.

FIG. 1 illustrates a configuration of a radar device according to the present embodiment.

The radar device according to the present embodiment includes transmitters 1-#1 to 1-#M, transmission antennas 2-#1 to 2-#M, transmission-side A/D converters 3-#1 to 3-#M, reception antennas 4-#1 to 4-#L, receivers 5-#1 to 5-#L, reception-side A/D converters 6-#1 to 6-#L, pulse compressors 7-#1 to 7-#L, transmission digital beam forming (DBF) units 8-#1 to 8-#L, a reception DBF unit 9, and a target detector 10.

The transmitters 1-#1 to 1-#M generate linear-frequency-modulated (FM) signals, where M (M≥2) represents the number of the transmitters. The transmission antennas 2-#1 to 2-#M correspond to the transmitters 1-#1 to 1-#M, respectively, and transmit the signals generated in the transmitters 1-#1 to 1-#M. The transmission-side A/D converters 3-#1 to 3-#M convert transmitted analog signals into digital signals. The reception antennas 4-#1 to 4-#L receive radiowaves that are sent from the transmission antennas 2-#1 to 2-#M and are reflected by a target, where L (L≥2) represents the number of the reception antennas. The receivers 5-#1 to 5-#L, respectively, limit the frequency bands of radiowaves received by the respective reception antennas 4-#1 to 4-#L and detect the phases of the radiowaves. The reception-side A/D converters 6-#1 to 6-#L, respectively, convert the analog signals from the receivers 5-#1 to 5-#L into digital signals.

The pulse compressors 7-#1 to 7-#L compress pulses in response to A/D-Converted Signals #1 to #L from the reception-side A/D converters 6-#1 to 6-#L and reference signals #1 to #M from the transmission-side A/D converters 3-#1 to 3-#M, which will be described below. The transmission DBF units 8-#1 to 8-#L are processors that form beams based on the compressed signals from the respective pulse compressors 7-#1 to 7-#L. The reception DBF unit 9 is a processor that combines the signals from the transmission DBF units 8-#1 to 8-#L in response to the transmitted beams. The target detector 10 is a processor that detects the direction of a target and the distance therefrom based on signals from the reception DBF unit 9. The pulse compressors 7-#1 to 7-#L to the target detector 10 make up a signal processor 11.

The transmitters 1-#1 to 1-#M, the transmission antennas 2-#1 to 2-#M, and the transmission-side A/D converters 3-#1 to 3-#M make up a transmission module that sends radiowaves of different frequency bands from the antennas. The reception antennas 4-#1 to 4-#L and the receivers 5-#1 to 5-#L make up a reception module that receives radiowaves sent from the transmission module and reflected by a target or target-reflected waves. Furthermore, the reception-side A/D converters 6-#1 to 6-#L, the pulse compressors 7-#l, and the transmission DBF units 8-#1 to 8-#L make up a synthetic processing module that suppresses false peaks resulting from signals of the target-reflected waves corresponding to the antennas in the reception module receiving the target-reflected waves and combines the signals. The false peaks are generated by shift of the target-reflected waves to other frequency bands by the Doppler frequency. The reception DBF unit 9 and the target detector 10 make up a detection processing module that detects a target based on results of combined signal from the synthetic processing module.

Figure 2:
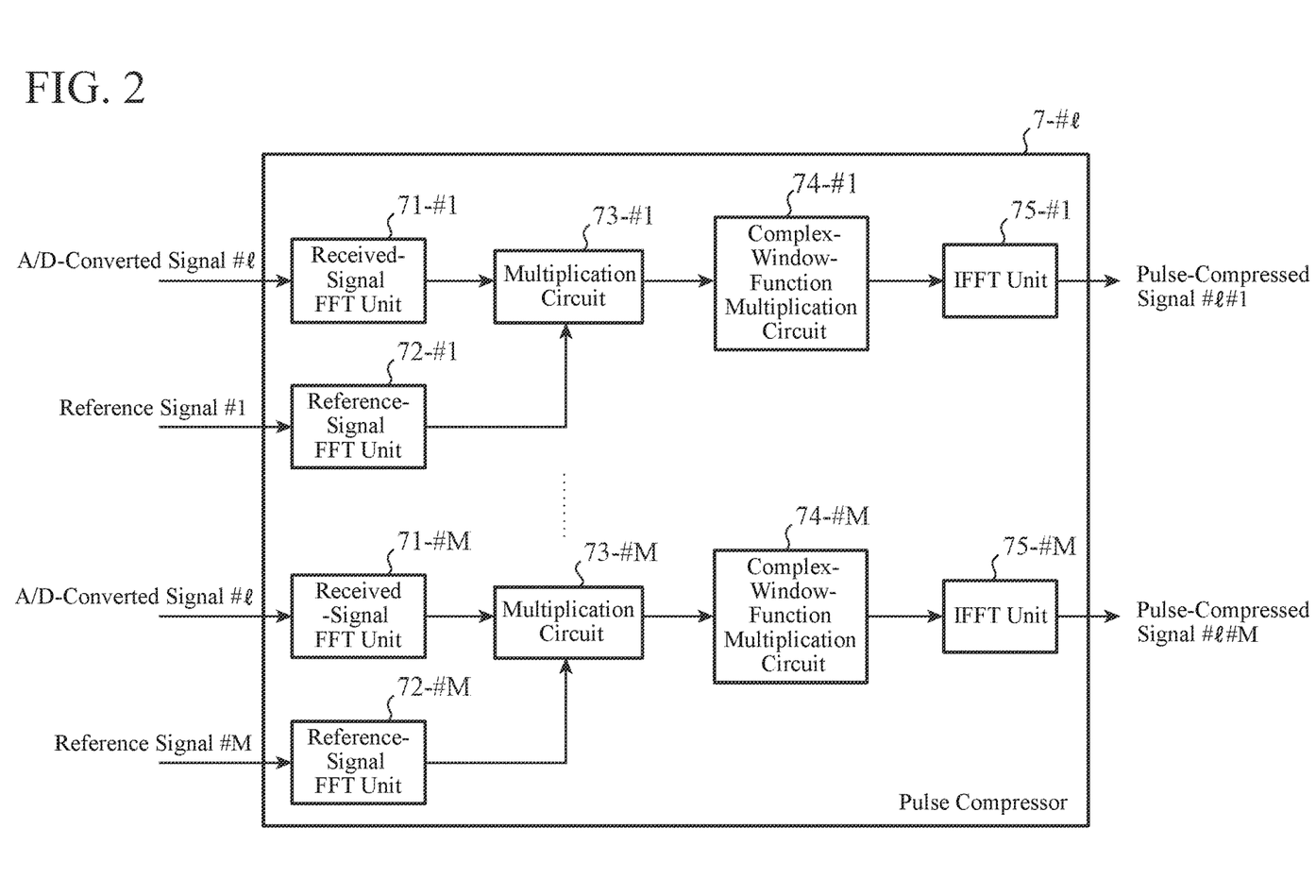
FIG. 2 illustrates a configuration of a pulse compressor in the radar device according to Embodiment 1 of the invention.

FIG. 2 is a block diagram illustrating an internal configuration of each of the pulse compressors 7-#l, where $1 \leq l \leq L$. As illustrated, the pulse compressor 7-#l includes received signal FFT units 71-#1 to 71-#M, reference signal FFT units 72-#1 to 72-#M, multiplication circuits 73-#1 to 73-#M, complex-window-function multiplication circuits 74-#1 to 74-#M, and IFFT units 75-#1 to 75-#M.

The received signal FFT units 71-#1 to 71-#M perform Fast Fourier Transforms (FFTs) on the A/D-Converted Signals #1 from the reception-side A/D converters 6-#l. The reference signal FFT units 72-#1 to 72-#M are operation units that enter signals from the transmission-side A/D converters 3-#1 to 3-#M as reference signals #1 to #M and execute the FFTs on the reference signals #1 to #M.

The multiplication circuits 73-#1 to 73-#M, respectively, multiply signals from the received signal FFT units 71-#1 to 71-#M by complex conjugates of signals from the reference signal FFT units 72-#1 to 72-#M. The complex-window-function multiplication circuits 74-#1 to 74-#M, respectively, multiply signals from the multiplication circuits 73-#1 to 73-#M by window functions defining notches neighboring false peaks occurring from the Doppler frequency. The IFFT units 75-#1 to 75-#M are operation units that perform Inverse Fast Fourier Transforms (IFFTs) on signals from the complex-window-function multiplication circuits 74-#1 to 74-#M.

Figure 3:
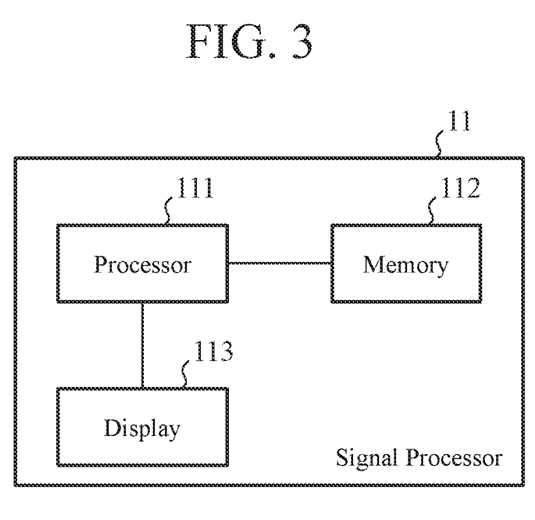
FIG. 3 illustrates a hardware configuration of a signal processor in the radar device according to Embodiment 1 of the invention.

FIG. 3 illustrates a hardware configuration of a signal processor 11 serving as a signal processing board. The illustrated signal processor 11 is, for example, a field-programmable gate array (FPGA) and includes a processor 111, a memory 112, and a display 113. The processor 111 performs pulse compression in the pulse compressor 7-#l, DBF processing in the transmission DBF units 8-#1 to 8-#L, DBF processing in the reception DBF units 9, and target detection processing in the target detector 10. The memory 112 stores programs to achieve the functions of the pulse compressors 7-#1 to 7-#L to the target detector 10 and is used as a work area of the signal processor 11. The display 113 presents the results of processing performed by the processor 111.

In the signal processor 11 having such a configuration, the processor 111 executes programs stored in the memory 112. The functions of the pulse compressors 7-#1 to 7-#L to the target detector 10 are thereby achieved.

The operation of the radar device according to Embodiment 1 will now be described.

Figure 4:
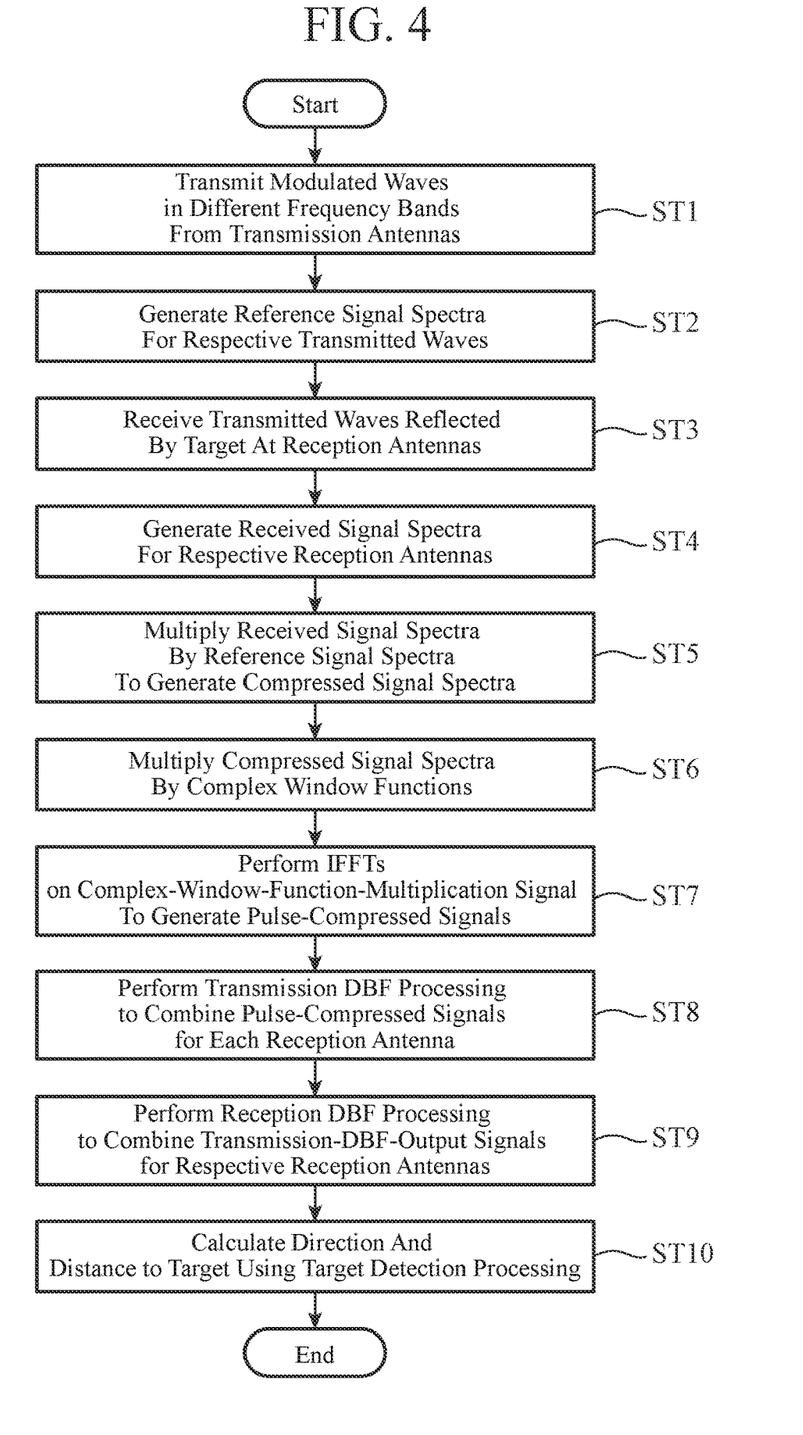
FIG. 4 is a flow chart of an operation of the radar device according to Embodiment 1 of the invention.

FIG. 4 is a flow chart of the operation of the radar device according to Embodiment 1.

Figure 5:
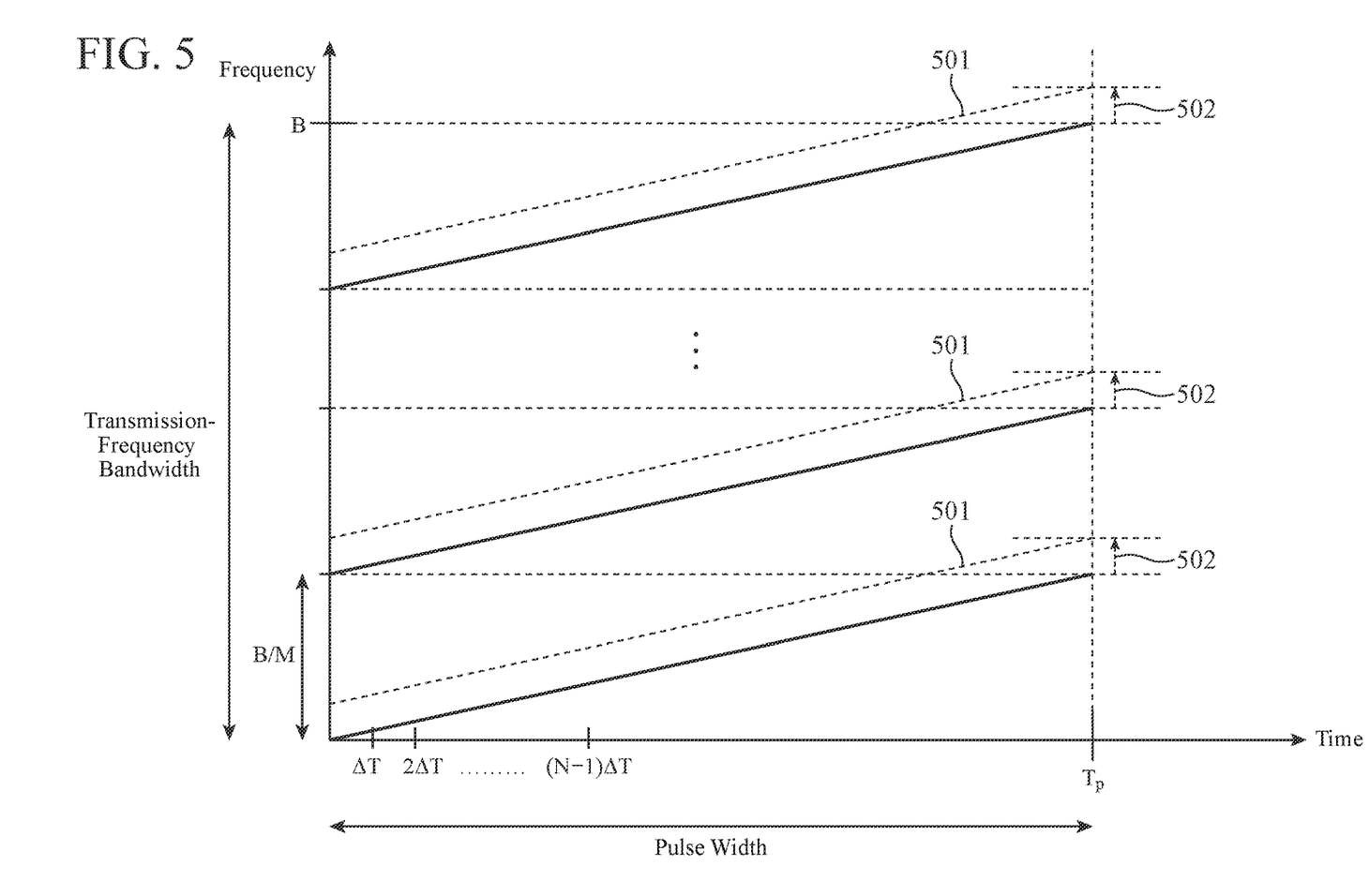
FIG. 5 is a graph illustrating frequency modulation of radiowaves generated in a transmitter in the radar device according to Embodiment 1 of the invention.

The transmitters 1-#m and the transmission antennas 2-#m transmit pulsed waves, where $1 \leq m \leq M$ (step ST1). The transmitted waves also propagate to the transmission-side A/D converters 3-#m, which output reference signals #m (step ST2). FIG. 5 illustrates frequency modulation of radiowaves generated by the transmitters 1-#1 to 1-#M. The transmission-frequency bandwidth is divided into M. The transmitters 1-#m use $m^{th}$ frequency band to generate linear FM modulated waves to be transmitted. The waves are also sent from the transmission antennas 2-#m. In FIG. 5, dotted lines 501 indicate received signal affected by the Doppler frequency, and arrows 502 indicate the Doppler frequency. The transmission antennas 2-#1 to 2-#M transmits radiowaves uncorrelated with each other. Alternatively, the transmission antennas 2-#1 to 2-#M may transmit radiowaves slightly overlapping with the transmission frequency bands of the transmitters 1-#1 to 1-#M, in other words, slightly correlated to each other.

The transmitted waves are reflected by a target and received by the respective reception antennas 4-#1 to 4-#L (step ST3). The radiowaves received by the reception antennas 4-#1 are phase-detected and limited in frequency bands by receivers 5-#1 and are then sent to the reception-side A/D converters 6-#1, where $1 \leq l \leq L$. The reception-side A/D converters 6-#1 convert the analog signals from the receivers 5-#1 into digital signals.

The signals from the reception-side A/D converters 6-#l or the A/D-Converted Signals #l are transmitted to the respective received signal FFT units 71-#1 to 71-#M in the pulse compressor 7-#l. The received signal FFT units 71-#1 to 71-#M perform FFTs on the received signals to generate the received signal spectra (step ST4), respectively. The received signal spectra are denoted by $x_{l, m, 1}, \ldots, x_{l, m, N}$. Reference signals #m ($1 \leq m \leq M$) are transmitted to the reference signal FFT units 72-#1 to 72-#M, respectively. The reference signal FFT units 72-#1 to 72-#M perform FFTs on the reference signals #m to generate the reference signal spectra. The reference signal spectra are denoted by $y_{m, 1}, \ldots, y_{m, N}$.

The received signal spectra $x_{l, m, 1}, \ldots, x_{l, m, N}$ and reference signal spectra $y_{m, 1}, \ldots, y_{m, N}$ are transmitted to the respective multiplication circuits 73-#1 to 73-#M. The multiplication circuits 73-#1 to 73-#M multiply the received signal spectra by the complex conjugates of the reference signal spectra to generate compressed signal spectra $z_{l, m, 1}, \ldots, z_{l, m, N}$ (step ST5).

$$z'_{l,m,n} = x_{l,m,n} y_{l,m,n}^*, \qquad (1)$$

where "*" represents a complex conjugate.

The complex-window-function multiplication circuits 74-#1 to 74-#M multiply complex window functions $w_{m, 1}, \ldots, w_{m, N}$ by the compressed signal spectra to output complex window function multiplication signals $w_{m, 1zl, m, 1}, \ldots, w_{m, Nzl, m, N}$ (step ST6).

Figure 6:
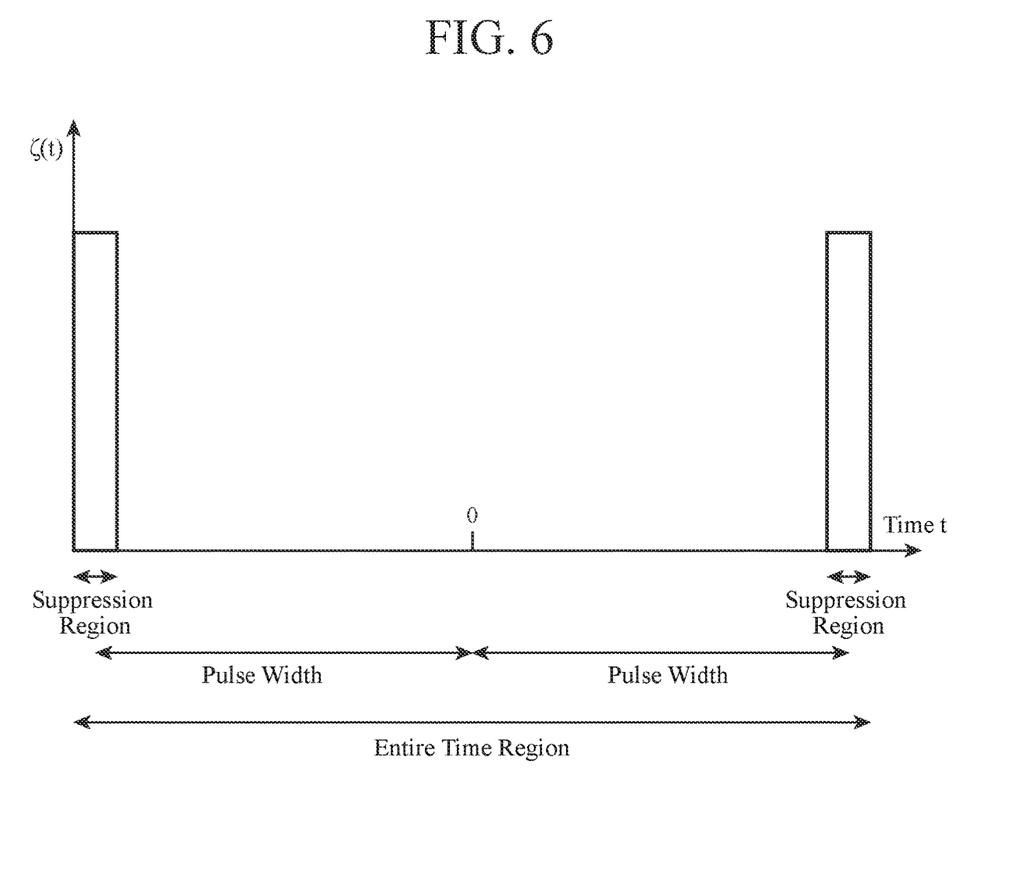
FIG. 6 is a graph illustrating the relation between the pulse width and a suppression region in the radar device according to Embodiment 1 of the invention.

The complex window functions $w_{m, 1} \ldots w_{m, N}$ are calculated as elements of a vector $w_m$ calculated by Expression (2). In Expression (2), 1 represents a 1×N vector of which elements are all 1, I represents a N×N unit vector, and ζ(t) represents a weight having a large factor of time region equal to a pulse width. FIG. 6 illustrates the relation between a pulse width and a suppression region. The suppression region corresponds to the domain where cross-correlation raises a sidelobe. In other words, if a pulse is compressed, the shift of spectra to the neighboring frequency bands by the Doppler frequency 502 causes false peaks having sidelobes raised by cross-correlation, as illustrated by dotted lines 501 in FIG. 5. Thus, the complex window functions $w_{m, 1} \ldots w_{m, N}$ are created to define notches in the domains of the false peaks such that the sidelobes raised by the cross-correlation is suppressed. The width and depth of a notch are controlled by a parameter ρ in Expression (2) and the width of the suppression region shown in FIG. 6. $x'_{m, 1}, \ldots, X'_{m, N}$ represents received pseudo signals.

$$w_m = R_m^{-1} 1 \qquad (2)$$

$$R_m = \int_{\text{Entire Time Region}} \zeta(t) \xi_m^{11}(t) \xi_m(t) dt + \rho I$$

$$\xi_m(t) = [|z'_{m,1}| \; |z'_{m,2}| \exp(j2\pi\Delta_f t) \ldots |z'_{m,N}| \exp(j2\pi(N-1)\Delta_f t)]$$

$$z'_{m,n} = x'_{m,n} \cdot y^*_{m,n}$$

$$x'_{m,n} = \sum_{m=1}^{M} y_{m,n}$$

The complex window function multiplication signals $w_{m, 1zl, m, 1}, \ldots, w_{m, Nzl, m, N}$ from the complex-window-function multiplication circuits 74-#1 to 74-#M are transmitted to the respective IFFT units 75-#1 to 75-#M. The IFFT units 75-#1 to 75-#M perform IFFTs on the complex window function multiplication signals $w_{m, 1zl, m, 1}, \ldots, w_{m, Nzl, m, N}$ to generate pulse-compressed signals $\eta_{l, m, 1}, \ldots, w_{m, Nzl, m, N}$ (step ST7). The number n in $\eta_{l, m, n}$ represents the number of the range bin of which the unit is a distance resolution determined from, for example, a transmission-frequency bandwidth B. The pulse-compressed signals $\eta_{l, m, 1}, \ldots, \eta_{l, m, N}$ (denoted by pulse-compressed signals #1 to #M in FIG. 1) are transmitted to the transmission DBF units 8-#1. The transmission DBF units 8-#1 each calculate phase correction values $\varphi_1(\theta)$ $\varphi_M(\theta)$ corresponding to expected original directions θ of radiowaves and the positions of the transmission antennas and then calculate a combined signal $g_{l, n}(\theta)$ in accordance with Expression (3) (step ST8).

$$g_{l,n}(\theta) = \sum_{m=1}^{M} \eta_{l,m,n} \exp(j\varphi_m(\theta)) \qquad (3)$$

The DBF signal $g_{l, n}(\theta)$ from the transmission DBF unit 8-#l is transmitted to the reception DBF unit 9. The reception DBF unit 9 calculates phase correction values $\psi_1(\theta)$ to $\psi_L$ (θ) corresponding to the directions θ of radiowaves and the positions of the reception antennas and then calculates a combined signal $h_n(\theta)$ in accordance with Expression (4) (step ST9).

$$h_n(\theta) = \sum_{l=1}^{L} g_{l,n}(\theta) \exp(j\psi_l(\theta)) \qquad (4)$$

The DBF signal $h_n(\theta)$ received from the reception DBF unit 9 is transmitted to the target detector 10. The target detector 10 compares the absolute value $|h_n(\theta)|$ of the received DBF signal with a threshold determined based on a false-alarm probability where a noise is erroneously determined to be a target signal. Signals exceeding the threshold are determined to be target signals in n range bins at the angle θ (step ST10).

In this manner, the radar device according to Embodiment 1 employs window functions to define notches at the positions away from the main lobe at intervals equal to pulse widths. False peaks due to the Doppler frequency can be thereby reduced and erroneous detection of a target can be prevented.

As described above, the radar device according to Embodiment 1 includes: a transmission module simultaneously transmitting radiowaves of different frequency bands from antennas; a reception module receiving target-reflected waves transmitted from the transmission module and reflected by a target; a synthetic processing module suppressing false peaks resulting from the target-reflected waves corresponding to the respective antennas in the reception module receiving the target-reflected waves, and combining the target waves; and a detection processing module detecting the target using a result of the combining obtained by the synthetic processing module. The false peaks are caused by shift to other frequency bands due to the Doppler frequency. Thus, erroneous detection of the target due to the false peaks can be prevented.

In accordance with the radar device of Embodiment 1, the transmission module includes: M transmitters generating analog signals having linear-frequency-modulated waveforms at different frequency bands where M is equal to or larger than 2; M transmission antennas transmitting the analog signals generated by the M transmitters as radiowaves; and M transmission-side A/D converters converting the analog signals generated by the M transmitters into digital signals. Thus, the transmission module can prevent erroneous detection of the target due to false peaks.

In accordance with the radar device of Embodiment 1, the reception module includes: L reception antennas receiving radiowaves reflected by the target where L≥2; and L receivers confining frequency bands of the radiowaves received by the L reception antennas and detecting phases of the radiowaves. Thus, the reception module can prevent erroneous detection of the target due to false peaks.

In accordance with the radar device of Embodiment 1, the synthetic processing module includes: L reception-side A/D converters converting analog signals from the reception module into digital signals; L pulse compressors suppressing the false peaks based on the digital signals from the L reception-side A/D converters and the M transmission-side A/D converters to compress pulses; and L transmission DBF units combining the respective compressed pulse signals from the L pulse compressors based on the analog signals generated by the M transmitters and having different frequency bands. Thus, the synthetic processing module can prevent erroneous detection of the target due to false peaks.

In accordance with the radar device of Embodiment 1, the detection processing module includes: a reception DBF unit combining the signals outputted from the L transmission DBF units; and a target detector detecting the target by a threshold determined based on a false-alarm probability erroneously detecting noises in the signals from the reception DBF unit as target signals. Thus, the detection processing module can prevent erroneous detection of the target due to false peaks.

In accordance with the radar device of Embodiment 1, L pulse compressors each include: M received-signal FFT units performing Fourier transforms on the digital signals from the reception-side A/D converters to generate received signal spectra; M reference-signal FFT units performing Fourier transforms on the digital signals from the transmission-side A/D converters to generate reference signal spectra; M multiplication circuits generating compressed signal spectra from the received signal spectra from the M received-signal FFT units and the reference signal spectra from the M reference-signal FFT units; M complex-window-function multiplication circuits multiplying window functions defining notches neighboring the false peaks by the compressed signal spectra from the M multiplication circuits; and M IFFT units performing inverse Fourier transforms on the signals outputted from the M complex-window-function multiplication circuits. Thus, the pulse compressor can prevent erroneous detection of the target due to false peaks.

Embodiment 2

Figure 7:
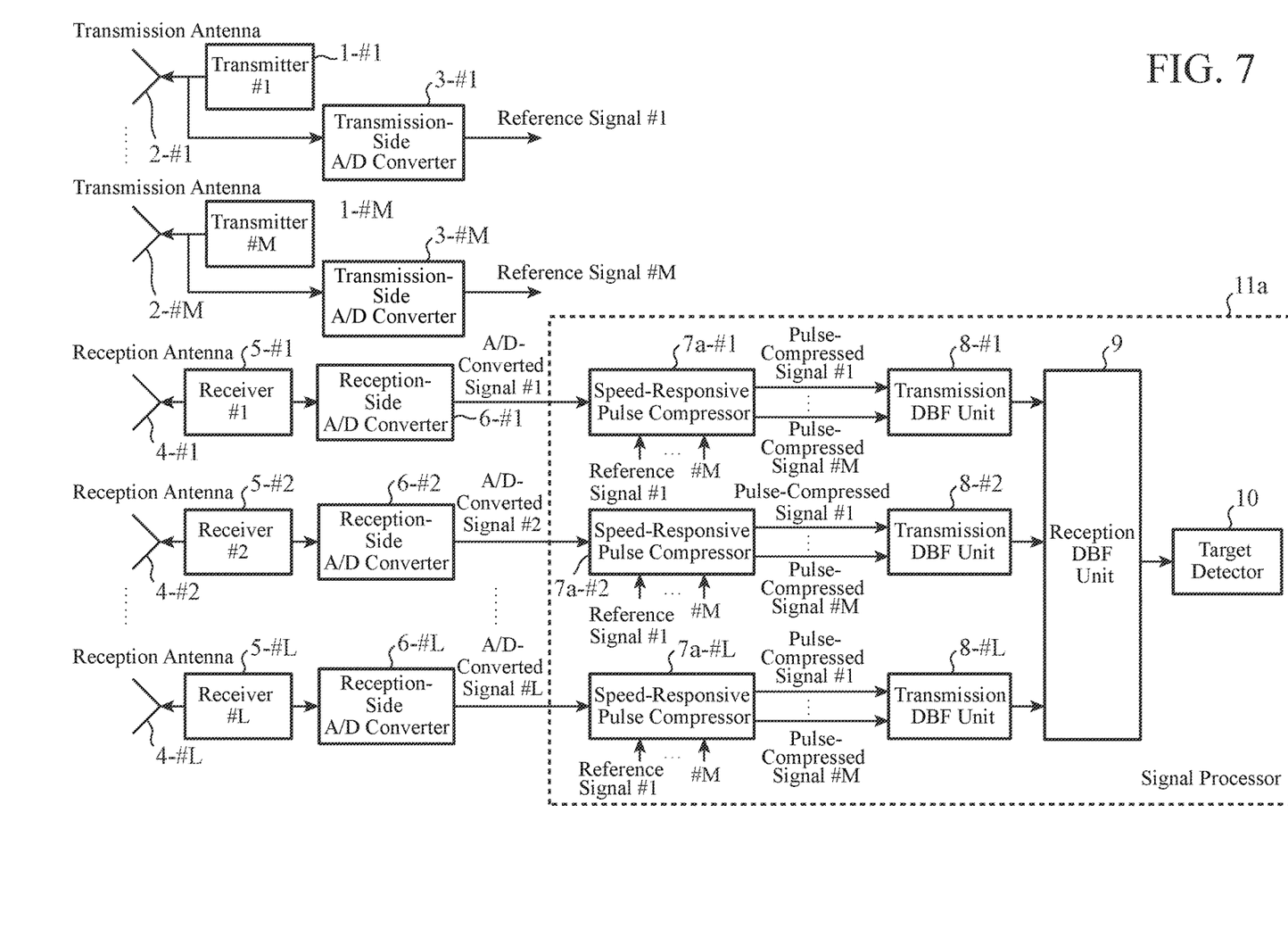
FIG. 7 illustrates a configuration of a radar device according to Embodiment 2 of the invention.

FIG. 7 illustrates a configuration of a radar device according to Embodiment 2.

The radar device according to Embodiment 2 includes transmitters 1-#1 to 1-#M, transmission antennas 2-#1 to 2-#M, transmission-side A/D converters 3-#1 to 3-#M, reception antennas 4-#1 to 4-#L, receivers 5-#1 to 5-#L, reception-side A/D converters 6-#1 to 6-#L, speed-responsive pulse compressors 7a-#1 to 7a-#L, transmission DBF units 8-#1 to 8-#L, a reception DBF unit 9, and a target detector 10. Components other than the speed-responsive pulse compressors 7a-#1 to 7a-#L in a signal processor 11a are the same as those of Embodiment 1 in FIG. 1 and are denoted by the same reference numerals without redundant description.

Figure 8:
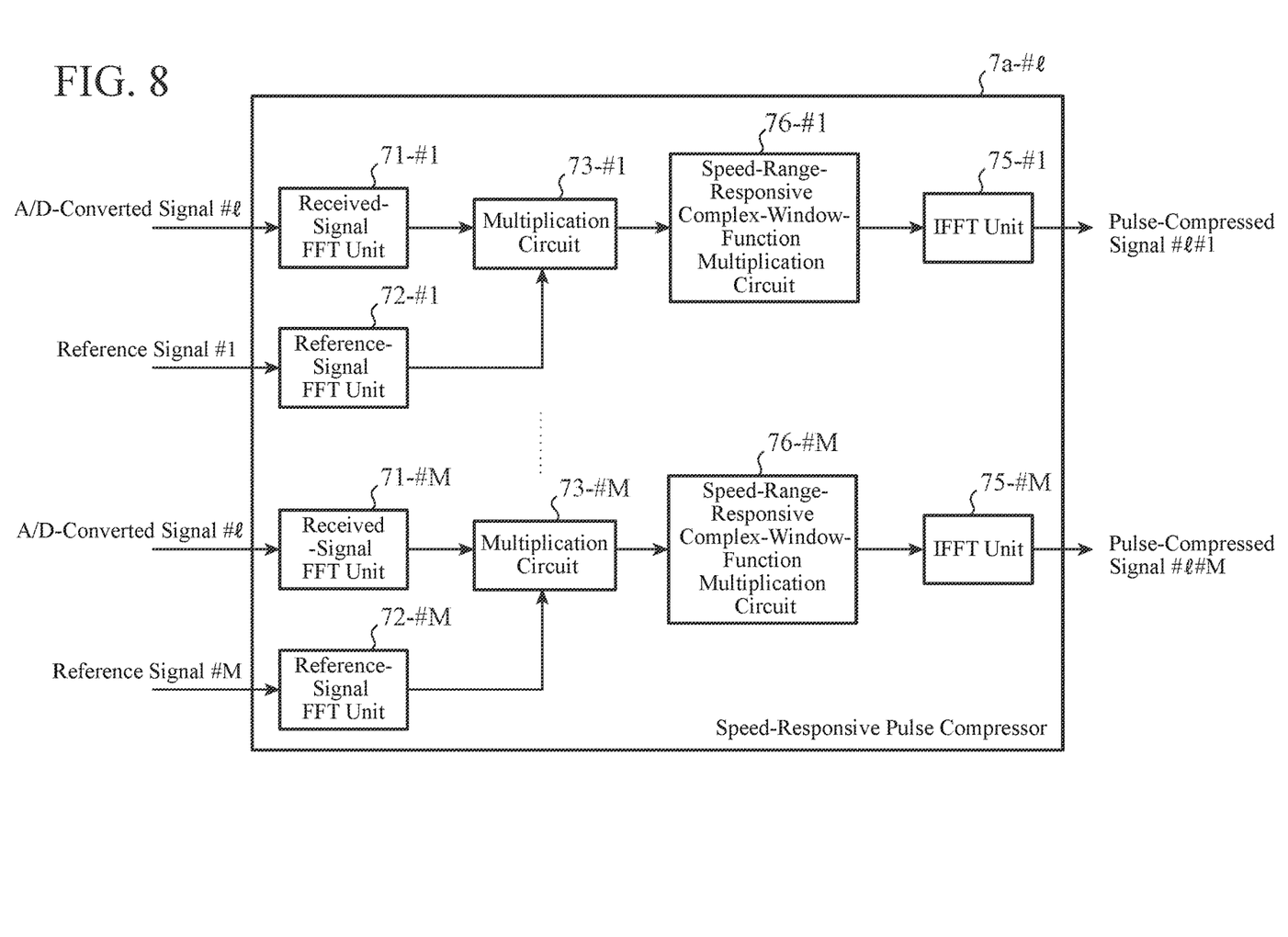
FIG. 8 illustrates a configuration of a pulse compressor in the radar device according to Embodiment 2 of the invention.

The speed-responsive pulse compressors 7a-#1 to 7a-#L suppress false peaks according to speed ranges. FIG. 8 illustrates an internal configuration of each of the speed-responsive pulse compressors 7a-#l, where 1≤l≤L.

In FIG. 8, the difference from the pulse compressor 7-#1 of Embodiment 1 is that speed-range-responsive complex-window-function multiplication circuits 76-#1 to 76-#M are provided instead of the complex-window-function multiplication circuits 74-#1 to 74-#M of Embodiment 1. Since the other configurations are the same as those in FIG. 2, the same components are denoted by the same reference numerals without redundant description.

The speed-range-responsive complex-window-function multiplication circuits 76-#1 to 76-#M calculate window functions defining notches neighboring false peaks from an expected target speed and multiply the window functions by signals from the multiplication circuits 73-#1 to 73-#M.

The signal processor 11a includes a speed-responsive signal processing board. The hardware configuration achieving the speed-responsive pulse compressors 7a-#1 to 7a-#L to the target detector 10 is the same as that including the processor 111, the memory 112, and the display 113 illustrated in FIG. 3 and is not described.

The operation of the radar device according to Embodiment 2 will now be explained.

The transmitters 1-#m and the transmission antennas 2-#m transmit pulsed waves, where 1≤m≤M. The subsequent operations from the reception antenna 4-#l at the reception side to the multiplication circuits 73-#1 to 73-#M in the speed-responsive pulse compressor 7a-#l are the same as those in Embodiment 1. When the spectra $z'_{l,m,1}, \ldots, z'_{l,m,N}$ of compressed signals from the multiplication circuits 73-#1 to 73-#M are transmitted to the speed-range-responsive complex-window-function multiplication circuits 76-#1 to 76-#M, the speed-range-responsive complex-window-function multiplication circuits 76-#1 to 76-#M multiply the complex window functions $w_{m,1} \ldots w_{m,N}$ by the compressed signal spectra. The complex window functions $w_{m,1} \ldots w_{m,N}$ are calculated as elements of a vector $w_m$ calculated according to Expression (5) below:

$$w_m = R_m^{-1} 1 \tag{5}$$

$$R_m = \sum_{m=1}^{M} \int_{\text{Entire Time Region}} \zeta(t) \xi_{m,k}^H(t) \xi_{m,k}(t) dt + \rho I$$

$$\xi_{m,k}(t) = [|z'_{m,k,1}| \; |z'_{m,k,1}| \exp(j2\pi\Delta_f t) \ldots |z'_{m,k,N}| \exp(j2\pi(N-1)\Delta_f t)]$$

$$z'_{m,k,n} = x'_{m,k,n} \cdot y^*_{m,n}$$

$$x'_{m,k,n} = \sum_{m=1}^{M} y'_{m,k,n}$$

where signals $y'_{m,1}, \ldots, y'_{m,N}$ represent spectrum components of signals of the target-reflected waves affected by the Doppler frequency and received by the transmission antennas −#m, and k is a parameter corresponding to the target speeds.

The received signal spectra affected by the Doppler frequency $y'_{m,1}, \ldots, y'_{m,N}$ are obtained, for example, by the Doppler shifting of reference signals $u_{m,1}, \ldots, u_{m,N}$ from the transmitters 1-#m according to Expression (6) below, generating Pseudo signals $u'_{m,k,1}, \ldots, u'_{m,k,N}$, which then undergo FFTs:

$$u'_{m,k,n} = u_{m,k,n} \exp\left(j2\pi \frac{2v_k}{\lambda} \Delta_t\right) \tag{6}$$

where λ represents a transmission wavelength, $v_k$ represents the $k^{th}$ target speed of multiple target speeds, and $\Delta_t$ represents a sampling interval of A/D conversion (by the transmission-side A/D converters 3-#1 to 3-#M and the reception-side A/D converters 6-#1 to 6-#L).

In Embodiment 2, the window functions used in ST6 in the flow chart of Embodiment 1 are replaced with those calculated according to Expression (5). In this manner, the window functions defining notches at the positions away from the main lobe at intervals equal to pulse widths are calculated from the expected target speeds. Thus, the speed range of the target from which the effects of suppressed false peaks are expected can be enlarged.

As described above, in accordance with the radar device of Embodiment 2, L pulse compressors each includes: M received-signal FFT units performing Fourier transforms on the digital signals from the reception-side A/D converters to generate received signal spectra; M reference-signal FFT units performing Fourier transforms on the digital signals from the transmission-side A/D converters to generate reference signal spectra; M multiplication circuits generating compressed signal spectra from the received signal spectra from the M received-signal FFT units and the reference signal spectra from the M reference-signal FFT units; M speed-range-responsive complex-window-function multiplication circuits calculating window functions defining notches neighboring the false peaks from an expected target speed and multiplying the window functions by the signals from the M multiplication circuits; and M IFFT units performing inverse Fourier transforms on the signals from the M speed-range-responsive complex-window-function multiplication circuits. Thus, the speed range of the target from which the effects of suppressed false peaks are expected can be enlarged.

Embodiment 3

Figure 9:
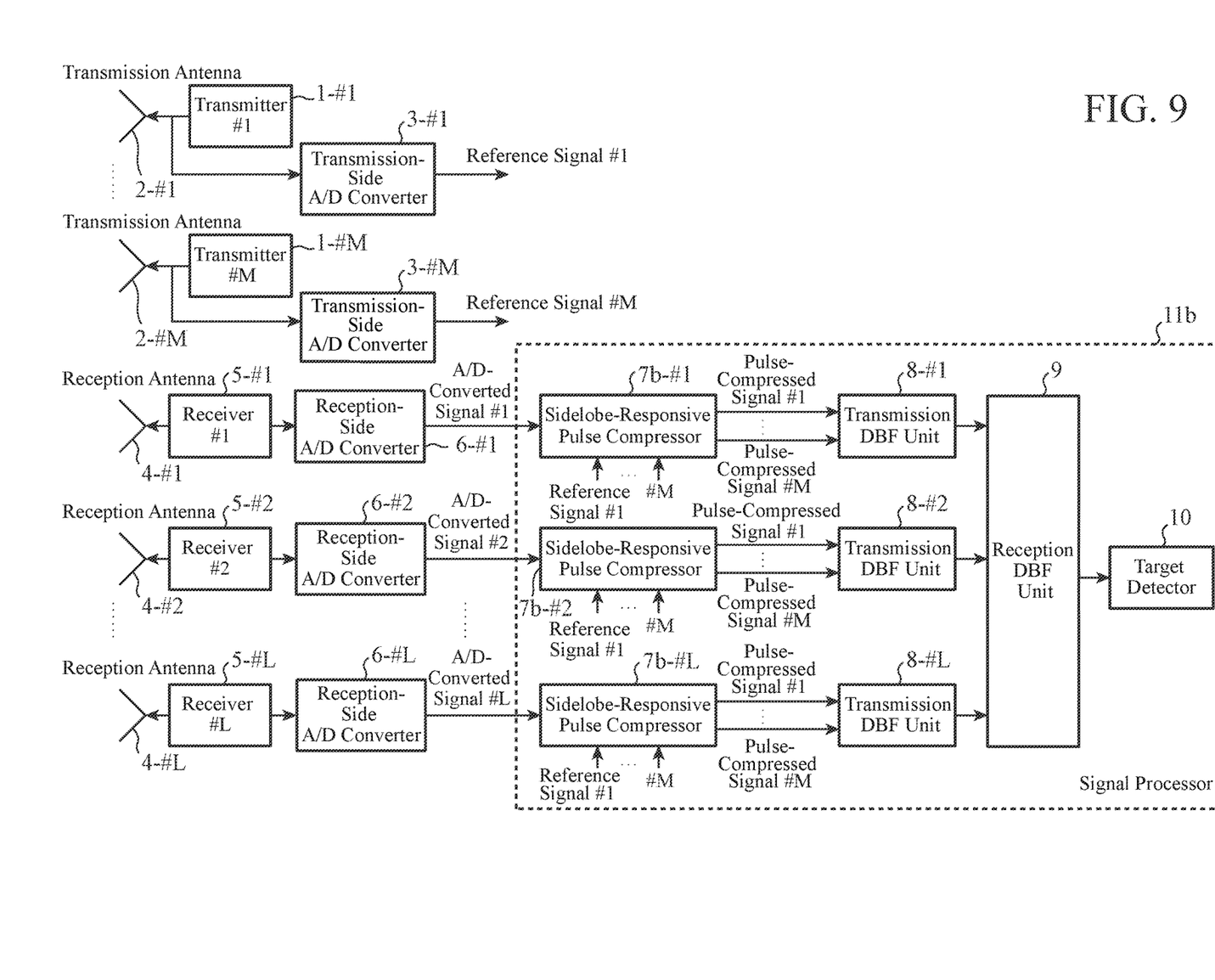
FIG. 9 illustrates a configuration of a radar device according to Embodiment 3 of the invention.

FIG. 9 illustrates a configuration of a radar device according to Embodiment 3.

The radar device according to Embodiment 3 includes transmitters 1-#1 to 1-#M, transmission antennas 2-#1 to 2-#M, transmission-side A/D converters 3-#1 to 3-#M, reception antennas 4-#1 to 4-#L, receivers 5-#1 to 5-#L, reception-side A/D converters 6-#1 to 6-#L, sidelobe-responsive pulse compressors 7b-#1 to 7b-#L, transmission DBF units 8-#1 to 8-#L, a reception DBF unit 9, and a target detector 10. Components other than the sidelobe-responsive pulse compressors 7b-#1 to 7b-#L are the same as those of Embodiment 1 in FIG. 1 and are denoted by the same reference numerals without redundant description.

Figure 10:
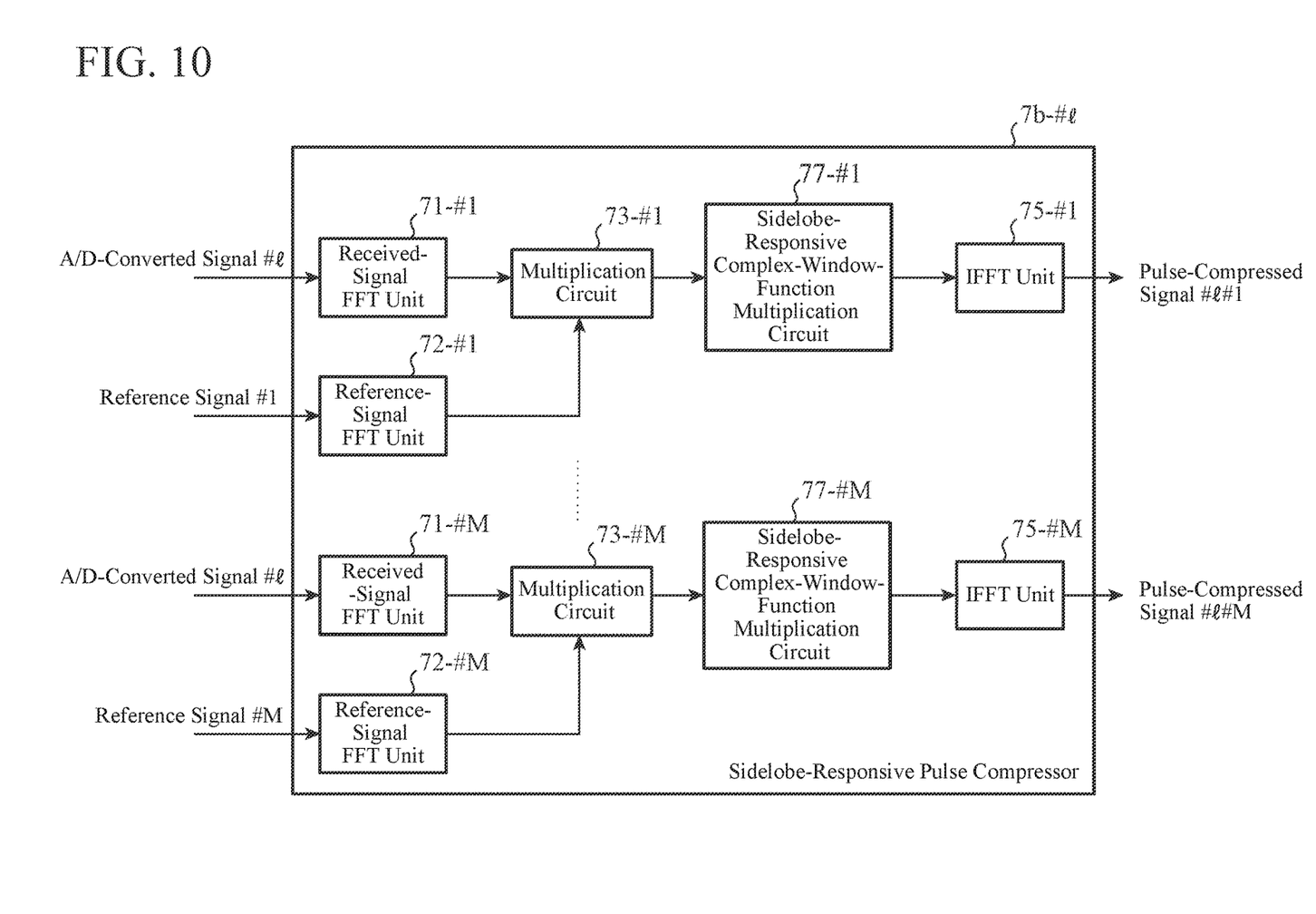
FIG. 10 illustrates a configuration of a pulse compressor in the radar device according to Embodiment 3 of the invention.

The sidelobe-responsive pulse compressors 7b-#1 to 7b-#L suppress false peaks responsive to sidelobes. FIG. 10 illustrates an internal configuration of the compressor.

In FIG. 10, the difference from the pulse compressors 7-#1 according to the Embodiment 1 is that the sidelobe-responsive complex-window-function multiplication circuits 77-#1 to 77-#M are provided instead of the complex-window-function multiplication circuits 74-#1 to 74-#M of Embodiment 1. Since the other configurations are the same as those in FIG. 2, the same components are denoted by the same reference numerals without redundant description.

The sidelobe-responsive complex-window-function multiplication circuits 77-#1 to 77-#M calculate window functions defining notches neighboring false peaks together with sidelobe levels to multiply the window functions by signals from the multiplication circuits 73-#1 to 73-#M.

The signal processor 11b includes a sidelobe-responsive signal processing board. The hardware configuration achieving the sidelobe-responsive pulse compressors 7b-#1 to 7b-#L to the target detector 10 is the same as that in FIG. 3 including the processor 111, the memory 112, and the display 113 and is not described.

The operation of the radar device according to Embodiment 3 will now be explained.

Figure 11:
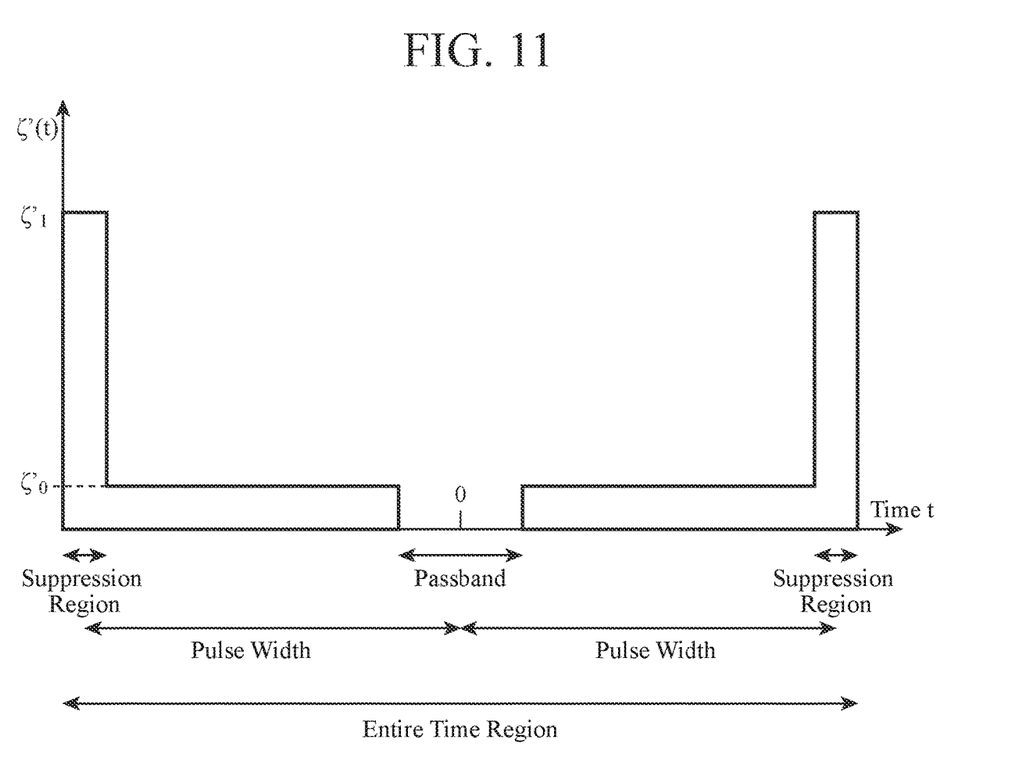
FIG. 11 a graph illustrating the relation between the pulse width and the suppression region in the radar device according to Embodiment 3 of the invention.

The transmitters 1-#m and the transmission antennas 2-#m transmit pulsed waves, where 1≤m≤M. The subsequent operations from the reception antennas 4-#1 at the reception side to the multiplication circuits 73-#1 to 73-#M in the sidelobe-responsive pulse compressor 7b-#l are the same as those in Embodiment 1. In response to transmission of the spectra $a_{l, m, 1}, \ldots, z_{l, m, N}$ of compressed signals from the multiplication circuits 73-#1 to 73-#M to the sidelobe-responsive complex-window-function multiplication circuits 77-#1 to 77-#M, the sidelobe-responsive complex-window-function multiplication circuits 77-#1 to 77-#M multiply the complex window functions $w_{m, 1} \ldots w_{m, N}$ by the compressed signal spectra. The complex window functions $w_{m, 1} \ldots w_{m, N}$ are calculated as elements of a vector $w_m$ calculated according to Expression (7):

$$w_m = R_m^{-1} \mathbf{1} \qquad (7)$$

$$R_m = \int_{\text{Entire Time Region}} \zeta'(t) \xi_m^H(t) \xi_m(t) dt + \rho I$$

$$\xi_m(t) = [|z'_{m,1}| \; |z'_{m,2}| \exp(j2\pi\Delta_f t) \; \ldots \; |z'_{m,N}| \exp(j2\pi(N-1)\Delta_f t)]$$

$$z'_{m,n} = x'_{m,n} \cdot y^*_{m,n}$$

$$x'_{m,n} = \sum_{m=1}^{M} y_{m,n}$$

where 1 represents a 1×N vector of which elements are all 1, I represents a N×N unit vector, and ζ'(t) represents a weight having an enlarged factor of time region that is equal to a pulse width and also adjusts the sidelobe levels. FIG. 11 illustrates the relation between the pulse width and the suppression region. The sidelobe level and the width and depth of a notch are controlled by parameters $\zeta'_0$ and $\zeta'_1$, the width of the suppression region, a passband width in FIG. 11, and a parameter ρ in Expression (7), and $x'_{m, 1}, \ldots, x'_{m, N}$ represents received pseudo signals.

In Embodiment 3, the window functions used in ST6 in the flow chart according to Embodiment 1 are replaced with those calculated in accordance with Expression (7), as described above. The window functions defining notches at the positions away from the main lobe at intervals equal to pulse widths are calculated together with the sidelobe levels. Thus, the effects of a reduction in sidelobe level and suppressed false peaks can be expected.

As described above, in accordance with the radar device of Embodiment 3, L pulse compressors each include: M received-signal FFT units performing Fourier transforms on the digital signals from the reception-side A/D converters to generate received signal spectra; M reference-signal FFT units performing Fourier transforms on the digital signals from the transmission-side A/D converters to generate reference signal spectra; M multiplication circuits generating compressed signal spectra from the received signal spectra from the M received-signal FFT units and the reference signal spectra from the M reference-signal FFT units; M sidelobe-responsive complex-window-function multiplication circuits calculating window functions defining notches neighboring the false peaks to multiply the window functions by the signals from the M multiplication circuits; and M IFFT units performing inverse Fourier transforms on the signals from the M sidelobe-responsive complex-window-function multiplication circuit. Thus, the effects of suppressed false peaks and a reduction in sidelobe level can be achieved.

It should be noted that the present invention can include any combination of embodiments, or modifications or omission of any component in the embodiments within the scope of the invention.

INDUSTRIAL APPLICABILITY

As described above, the radar device according to the present invention is targeted at a configuration that prevents erroneous detection, caused by false peaks due to the Doppler frequency, of a target, and is suitable for use in, for example, multi-input multi-output (MIMO) radars.

REFERENCE SIGNS LIST

1-#1 to 1-#M: transmitters,
2-#1 to 2-#M: transmission antennas,
3-#1 to 3-#M: transmission-side A/D converters,
4-#1 to 4-#L: reception antennas,
5-#1 to 5-#L: receivers,
6-#1 to 6-#L: reception-side A/D converters,
7-#1 to 7-#L: pulse compressors,
8-#1 to 8-#L: transmission DBF units,
9: reception DBF unit,
10: target detector,
11, 11a, 11b: signal processors,
71-#1 to 71-#M: received signal FFT units,
72-#1 to 72-#M: reference signal FFT units,
73-#1 to 73-#M: multiplication circuits,
74-#1 to 74-#M: complex-window-function multiplication circuits,
75-#1 to 75-#M: IFFT units,
76-#1 to 76-#M: speed-range-responsive complex-window-function multiplication circuits, and
77-#1 to 77-#M: sidelobe-responsive complex-window-function multiplication circuits.

The invention claimed is:

1. A radar device comprising:
    a transmission module configured to concurrently transmit radiowaves of different frequency bands from antennas;
    a reception module configured to receive target-reflected waves transmitted from the transmission module and reflected by a target;
    a synthetic processing module configured to combine the target-reflected waves corresponding to the respective antennas, received by the reception module, in a manner that suppresses false peaks caused by shift to other frequency bands due to the Doppler frequency; and
    a detection processing module configured to detect the target using a result of the combining obtained by the synthetic processing module,
    wherein the transmission module includes
    M transmitters configured to generate signals having linear-frequency-modulated waveforms at different frequency bands where M is equal to or larger than 2,
    M transmission antennas configured to transmit the signals generated by the M transmitters as radiowaves, and
    M transmission-side A/D converters configured to convert the analog signals generated by the M transmitters into digital signals, and
    wherein the synthetic processing module includes
    L reception-side A/D converters configured to convert output signals of the reception module into digital signals,
    L pulse compressors configured to perform pulse compressions using output signals of the L reception-side A/D converters and the M transmission-side A/D converters, and using window functions defining notches that suppress the false peaks, and
    L transmission DBF units configured to combine output signals of the L pulse compressors based on the signals having different frequency bands, generated by the M transmitters.

2. The radar device according to claim 1, wherein the reception module includes:
    L reception antennas configured to receive radiowaves reflected by the target where L is equal to or larger than 2; and
    L receivers configured to limit frequency bands of the radiowaves received by the L reception antennas and to detect phases of the received radiowaves.

3. The radar device according to claim 1, wherein the detection processing module includes:
    a reception DBF unit configured to combine output signals of the L transmission DBF units; and
    a target detector configured to detect the target by using a threshold determined based on a false-alarm probability to erroneously detect noises as target signals for an output signal of the reception DBF unit.

4. The radar device according to claim 1, wherein each of the L pulse compressors includes:
    M received-signal FFT units configured to perform Fourier transforms on output signals of the reception-side A/D converters to generate received signal spectra;
    M reference-signal FFT units configured to perform Fourier transforms on output signals of the transmission-side A/D converters to generate reference signal spectra;
    M multiplication circuits configured to generate compressed signal spectra from output signals of the M received-signal FFT units and output signals of the M reference-signal FFT units;
    M speed-range-responsive complex-window-function multiplication circuits configured to calculate the window functions from expected target speeds, and to multiply the calculated window functions by output signals of the M multiplication circuits; and
    M IFFT units configured to perform inverse Fourier transforms on output signals of the M speed-range-responsive complex-window-function multiplication circuits.

5. The radar device according to claim 1, wherein each of the L pulse compressors includes:
    M received-signal FFT units configured to perform Fourier transforms on output signals of the reception-side A/D converters to generate received signal spectra;
    M reference-signal FFT units configured to perform Fourier transforms on output signals of the transmission-side A/D converters to generate reference signal spectra;
    M multiplication circuits configured to generate compressed signal spectra from output signals of the M received-signal FFT units and output signals of the M reference-signal FFT units;
    M sidelobe-responsive complex-window-function multiplication circuits configured to calculate the window functions defining notches that suppress the false peaks and sidelobe levels, and to multiply the calculated window functions by output signals of the M multiplication circuits; and M IFFT units configured to perform inverse Fourier transforms on output signals of the M sidelobe-responsive complex-window-function multiplication circuits.

6. A radar device comprising:

a transmission module configured to concurrently transmit radiowaves of different frequency bands from antennas;

a reception module configured to receive target-reflected waves transmitted from the transmission module and reflected by a target;

a synthetic processing module configured to combine the target-reflected waves corresponding to the respective antennas, received by the reception module, in a manner that suppresses false peaks caused by shift to other frequency bands due to the Doppler frequency; and a detection processing module configured to detect the target using a result of the combining obtained by the synthetic processing module, wherein the transmission module includes M transmitters configured to generate signals having linear-frequency-modulated waveforms at different frequency bands where M is equal to or larger than 2, M transmission antennas configured to transmit the signals generated by the M transmitters as radiowaves, and M transmission-side A/D converters configured to convert the analog signals generated by the M transmitters into digital signals, and wherein the synthetic processing module includes L reception-side A/D converters configured to convert output signals of the reception module into digital signals, L pulse compressors configured to perform pulse compressions using output signals of the L reception-side A/D converters and the M transmission-side A/D converters, and L transmission DBF units configured to combine output signals of the L pulse compressors based on the signals having different frequency bands, generated by the M transmitters, wherein each of the L pulse compressors includes:

M received-signal FFT units configured to perform Fourier transforms on output signals of the reception-side A/D converters to generate received signal spectra;

M reference-signal FFT units configured to perform Fourier transforms on output signals of the transmission-side A/D converters to generate reference signal spectra;

M multiplication circuits configured to generate compressed signal spectra from output signals of the M received-signal FFT units and output signals of the M reference-signal FFT units;

M complex-window-function multiplication circuits configured to multiply window functions defining notches neighboring the false peaks, by output signals of the M multiplication circuits; and M IFFT units configured to perform inverse Fourier transforms on output signals of the M complex-window-function multiplication circuits.

* * * * *